J. B. OATMAN.
PUNCTURE PROOF ATTACHMENT FOR TIRES.
APPLICATION FILED AUG. 7, 1907.
921,444.
Patented May 11, 1909.
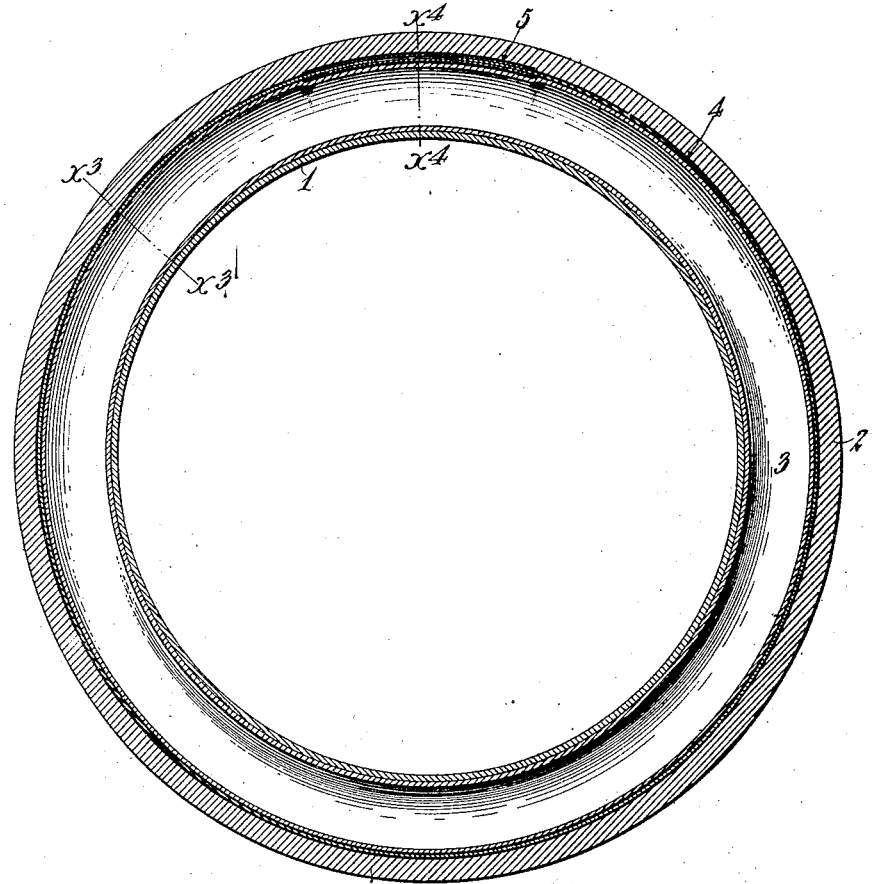
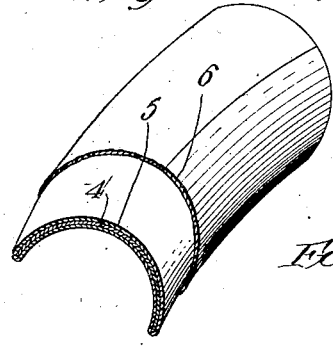
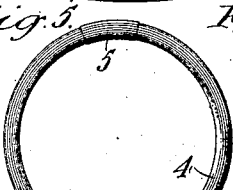
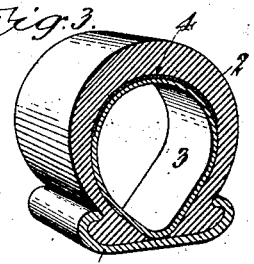
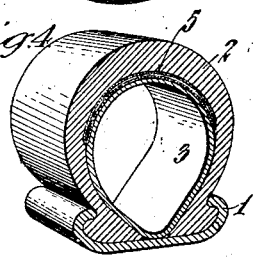

UNITED STATES PATENT OFFICE.

JESSE B. OATMAN, OF RIVERSIDE, CALIFORNIA.

PUNCTURE-PROOF ATTACHMENT FOR TIRES.

No. 921,444.     Specification of Letters Patent.     Patented May 11, 1909.

Application filed August 7, 1907. Serial No. 387,561.

*To all whom it may concern:*

Be it known that I, JESSE B. OATMAN, a citizen of the United States, residing at Riverside, county of Riverside, State of California, have invented a new and useful Puncture-Proof Attachment for Tires, of which the following is a specification.

This invention relates to an attachment which may be applied to practically all standard styles of pneumatic tires and which, when applied, will render the tire puncture proof, the objects of the invention being to provide a simple device for this purpose which is very inexpensive and which may be readily applied without reconstruction of the tire; another object being to give full protection to the inner tube against puncture and yet remove none of the resilient qualities of the tire.

The accompanying drawings illustrate one form of the invention and referring thereto:—

Figure 1 is a cross sectional view taken circumferentially through a tire equipped with the invention. Fig. 2 is an enlarged perspective, partly in section, of a portion adjacent the sleeve of the device. Fig. 3 is a perspective, partly in section, on line $x^3$—$x^3$ Fig. 1. Fig. 4 is a perspective, partly in section, on line $x^4$—$x^4$ Fig. 1. Fig. 5 is a side elevation on a reduced scale of the puncture proof attachment removed from the tire.

1 designates the rim of the wheel, 2 designates the casing or shoe, and 3 is the inner air tube, all of which may be of any desired construction.

The invention comprises a strip of non-puncturable material which is adapted to be slipped into the casing to lie between the inner tube 3 and the casing 2. In its preferred form the device comprises a strip of spring steel 4 which, in cross section, is curved to conform to the inner contour of the outer casing 2 of the tire and which preferably embraces an arc slightly less than half a circle. The steel strip 4 forms an expansible circular ring, its ends lying adjacent to each other in the same plane and being telescopically connected, one end being provided with a sleeve 5 as shown in Fig. 2, which is flat and entirely encircles the strip transversely and within which the other end of the steel is adapted to slide. The strip is preferably covered with a layer of canvas 6, the application of which may be made by first coating the strip with shellac and then applying the canvas, the shellac causing the canvas to permanently adhere to the strip of steel. The inner sliding end of the strip, as shown in Fig. 4, may project normally about half way into the sleeve when the ring is expanded to fit the casing. This telescopic joint enables the steel ring to be contracted in size to enable it to be slipped through the inner diameter of the tire, after which the natural spring of the steel causes the ring to expand so that it fits snugly against the inside wall of the casing and it also prevents the inner or movable end of the strip from engaging with the inner tube, or with the canvas when the latter is used, and wearing it out. In Fig. 1 the canvas is shown by the heavy black lines on both sides of the steel strip, Fig. 2 being an enlarged view gives a clearer illustration of the manner in which the canvas covering surrounds the steel strip particularly at the sleeve portion.

It is obvious that this device may be very cheaply constructed and that it may be very easily and quickly applied to a tire. When in place in the tire and the inner tube blown up with the air pressure, the strip is firmly held between the inner tube and outer casing. If a nail, for example, punctures the outer casing, the steel strip being under the air pressure of the inner tube and firmly supported, acts as an anvil to turn the point of a nail and bend the nail and thus prevent the nail from passing through the inner tube and allowing the air to escape. In this manner the steel strip will deflect any instrument or thing which is capable of being bent and which punctures the outer casing so as to strike the steel. Any rigid, sharp substance, such as glass, for example, which may cut through the outer tube, is prevented from reaching the inner air tube by the steel strip. In practice, after the most severe tests possible to apply, I have found that the steel strip renders the inner tube impregnable against puncture. The strip being of spring steel yields and conforms to the flexure of the outer casing in use, and therefore the resiliency of the tire is not noticeably affected.

One of the greatest points of advantage of this invention is that it is of exceedingly cheap construction and may be applied to practically any pneumatic tire using an inner tube; moreover, the device is entirely concealed and the appearance of the tire is unmarred.

What I claim is:—

1. In a tire, an outer casing, an inner air tube, a ring between the tube and the casing formed from a thin sheet of metal, curved in cross section and having its ends lying adjacent to each other in the same plane, and a flat metallic sleeve entirely encircling the ends of said ring and curved in cross section to correspond with the curvature thereof.

2. In a tire, an outer casing, an inner air tube, a ring between the tube and the casing formed from a thin sheet of metal, curved in cross section and having its ends lying adjacent to each other in the same plane, a flat sleeve completely encircling both of said ends with one of said ends sliding freely therein, and a canvas covering upon said ring and sleeve and secured thereto.

In testimony whereof, I have hereunto set my hand at Los Angeles, California, this 1st day of August 1907.

JESSE B. OATMAN

In presence of—
  GEORGE T. HACKLEY,
  FRANK L. A. GRAHAM